United States Patent [19]

Darby

[11] Patent Number: 4,728,316

[45] Date of Patent: * Mar. 1, 1988

[54] CONTROL MEANS FOR SHIFTING GEARS ON DUAL SHIFT BICYCLES

[76] Inventor: Jack B. Darby, 518 First St. E., Scott City, Mo. 63780

[*] Notice: The portion of the term of this patent subsequent to Oct. 28, 2003 has been disclaimed.

[21] Appl. No.: 923,116

[22] Filed: Oct. 24, 1986

Related U.S. Application Data

[63] Continuation of Ser. No. 751,583, Jul. 3, 1985, Pat. No. 4,619,631.

[51] Int. Cl.⁴ ............................................. F16H 9/00
[52] U.S. Cl. .......................................... 474/80; 474/82
[58] Field of Search .............................. 474/80, 82, 78

[56] References Cited

U.S. PATENT DOCUMENTS

4,470,823  9/1984  Shimano ................................ 474/82
4,619,631 10/1986  Darby .................................. 474/82 X

Primary Examiner—James A. Leppink
Assistant Examiner—Thuy M. Bui
Attorney, Agent, or Firm—Cushman, Darby & Cushman

[57] ABSTRACT

An easy to operate control means for shifting gears on dual shift bicycles is described. The control means is constructed so that the front and rear derailleurs of a dual shift bicycle are controlled together to shift to any selected gear from any engaged gear with a single operator action. The design permits the operator to preselect the new gear to be used while continuously pedaling in the present gear, with the actual gear change being made at the operator's discretion. The design also facilitates a rapid series of down shifts without requiring intervening gear selections.

25 Claims, 18 Drawing Figures

CONTROL MEANS FOR SHIFTING GEARS ON DUAL SHIFT BICYCLES

This is a continuation of copending application Ser. No. 751,583, filed July 3, 1985, now Pat. No. 4,619,631.

BACKGROUND AND SUMMARY OF THE INVENTION

The present invention relates to an improvement in means for shifting gears on dual shift bicycles, i.e., bicycles having two sets of sprocket clusters and means for shifting the drive chain between the sprockets thereof. Such bicycles generally are designed to operate at various gear ratios (speeds), such as 10, 12, 15 etc.

The dual shift bicycles in use today have two shift handles, one for each of the front and rear derailleur mechanisms, and are cumbersome and difficult to operate. The two handles are interactive and must be manipulated in a manner that is beyond the knowledge and skill of the average operator (bike rider). The bike rider must operate either or both of the gear selection handles in order to shift the bicycle to the desired gear ratio. The two handles must be adjusted further after the shift is completed, such further adjustment generally being made by ear while listening for rubbing and/or grinding of the drive chain. It is extremely difficult for the operator to remember which handle or handles are to be operated to place the gear shift in the desired one of the ten different gear ratios and the operator must also consider whether he is shifting up or down and remember which gear he is in prior to the shifting operation.

In my prior patent, U.S. Pat. No. 4,412,828, there is disclosed a control means for shifting gears on dual shift bicycles that is easy to operate and is constructed so that the front and rear derailleurs are controlled together to shift to any selected gear from any engaged gear with a single operator action. Accordingly, the operator need not concern himself with which one or both of the derailleurs is to be shifted, which direction to shift the derailleurs, or how much the derailleurs are to be shifted. Also, there is provided a pre-select feature that allows the operator to anticipate and select the next gear change while continuously pedaling in the present gear. The actual gear change can be postponed by the operator indefinitely or can be overridden by a different subsequent selection if desired. Furthermore, the control means operates to directly position both front and rear derailleurs for the selected gear without any back and forth shifting for intermediate gears. This allows for the fastest possible shift between any two gears. A feature of the control means is that shifting can take place with both hands of the operator (bicycle rider) on the handle bars to provide increased safety and better control. Furthermore, the selection and control means are designed to facilitate a rapid series of down shifts. (Rapid down shifting, for example, as needed for efficient hill climbing). Such a series of down shifts can be made without intervening gear selections between shifts.

In the achievement of the above-described ends, the mechanism indicates the gear presently engaged or preselected by the operator, i.e., gear ratios (speeds) 1-10 for a ten speed bicycle, and provide for simple, error free shifting into any selected higher or lower gear. The bicycle rider need not be concerned with calculating or memorizing any shifting sequence.

It is the general object of the present invention to provide an improvement over the shift control mechanism disclosed in my prior patent. Briefly, the shift control mechanism of the present invention includes the following improvements over the prior design:

(1) There are no modifications required to the standard type of derailleurs in use today.
(2) The design uses standard stranded control cables.
(3) The mechanism is adjustable for use with various derailleur types and bicycle sizes.
(4) The design is flexible such that it can be adapted easily for use with either "O.E.M." and aftermarket versions.
(5) The design uses improved operator controls.
(6) The design employs simplified cable routing.
(7) The design involves improved operating margins for the shifter.
(8) The design employs a simpler and smaller shifter.

DETAILED DESCRIPTION OF THE PREFERRED EMBODIMENT

Figures 1, 1A:
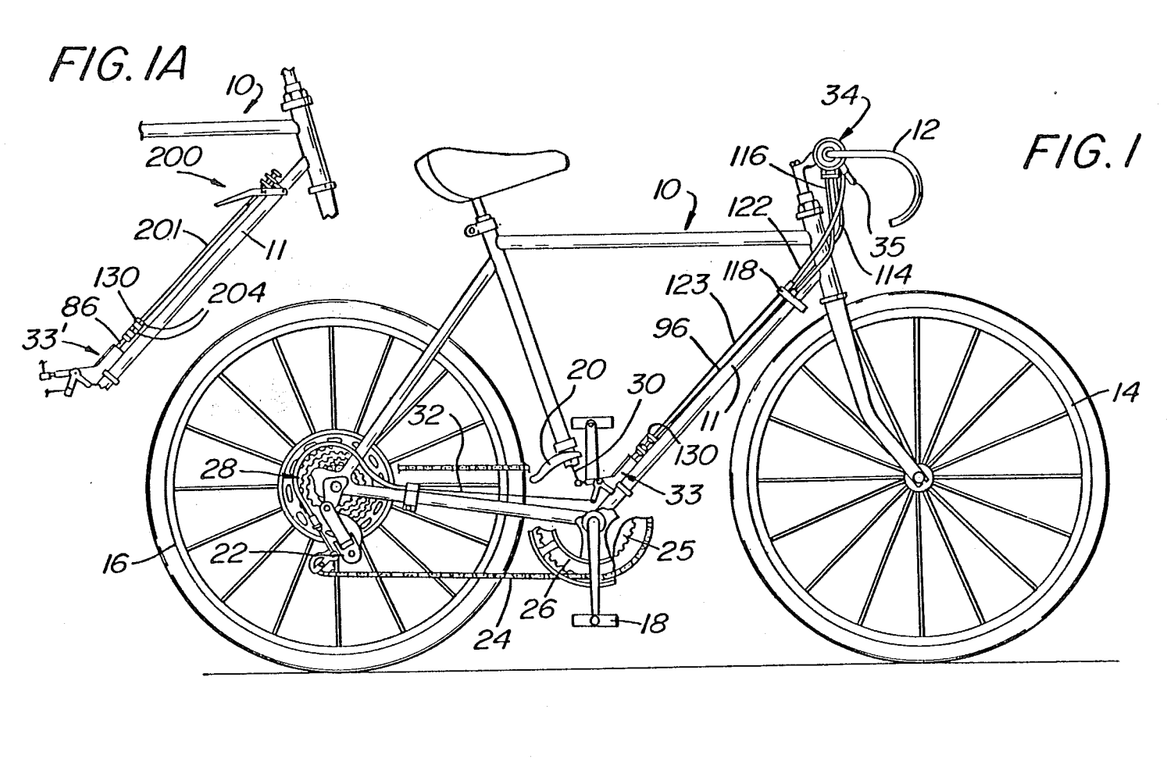
FIG. 1 is a side elevational view of a ten speed bicycle provided with the shift control mechanism in accordance with the invention.
FIG. 1A is a fragmentary view of an alternate selector actuator means in accordance with the invention.

Referring first to FIG. 1, there is shown a generally conventional ten speed bicycle comprised of a frame indicated generally at 10 onto which are mounted handle bars 12, a front wheel 14, a rear wheel 16, and pedals 18. There is also provided a front derailleur 20 and a rear derailleur 22. As is conventional, the front derailleur 20 is constructed and arranged to shift a drive chain 24 to either of two sprockets 25 and 26 of a front sprocket cluster and the rear derailleur 22 is constructed and arranged to shift chain 24 into engagement with any one of the five sprockets of the rear sprocket cluster indicated at 28. In the conventional two-handle shifting mechanisms in use today, the shifting is provided by a pair of hand shift levers on the handle bar or bike frame which move actuating cables which extend from the levers to the associated front or rear derailleur.

The above-described mechanism is conventional in the art and operates to shift the bicycle to any of its ten gears by actuation of the cable means 30 and 32 connected at one end to the front and rear derailleurs 20 and 22, respectively. In my prior patent, in order to accommodate the shift mechanism, the cable means 30 and 32 had to be constructed with a solid (not stranded) center wire that transmits motion by both pushing and pulling. Also, the sheaths of cable means 30 and 32 had to be attached to the derailleurs via suitable immobilizing connectors. In addition, the return springs of both the front and rear derailleurs had to be removed or made inoperative for the typical derailleurs in current use. However, with the present invention, as will appear hereafter, the standard stranded control cables may be used and the derailleurs do not have to be modified whereby the most common or standard type of derailleur may be used. The standard type of derailleur in use today operates by the use of return springs which apply a pulling force from the deailleur to the end of the control cable means 30 and 32. In accordance with the invention there is provided shifting means for positioning the cable means 30 and 32 for the front and rear derailleurs to the desired gear position.

Figure 2:
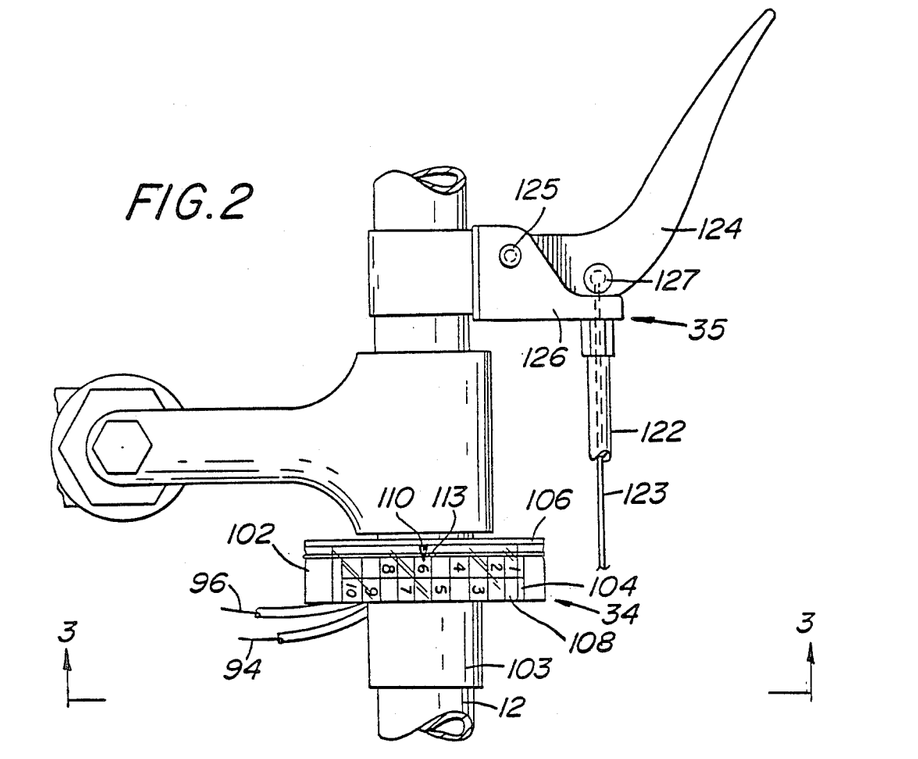
FIG. 2 is a detail view showing the speed selector means and the actuator lever assembly mounted on the handle bars of the bicycle shown in FIG. 1.

The embodiment of the invention shown in FIGS. 1-14 comprises a shifter assembly 33, a selector positioning assembly 34 and an actuator lever assembly 35. Shifter assembly 33 is mounted on the frame member 11 of the bicycle at a location adjacent to the front derailleur for mechanical connection thereto as will be described hereafter. Selector positioning assembly 34 is mounted by suitable brackets at a central location on the handle bars 12 of the bicycle as is best shown in FIG. 2. Actuator lever mechanism 35 is also mounted on the handle bars 12 of the bicycle at an appropriate location for convenient use thereof as shown in FIG. 2.

Figure 14:
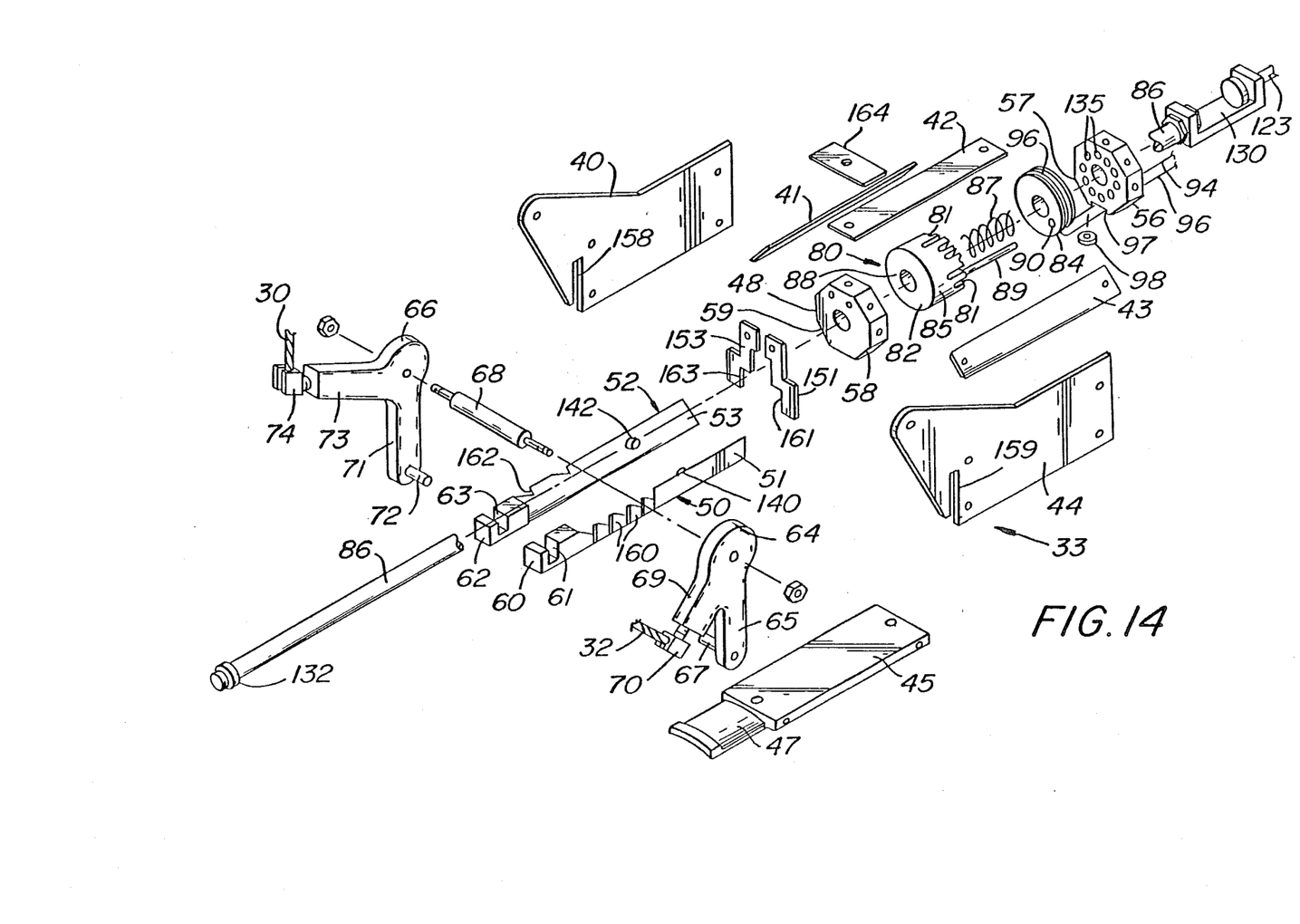
FIG. 14 is an exploded view showing the various parts of the selector assembly.

As is best shown in FIG. 14 shifter assembly 33 includes two side plates 40 and 44, three top plates 41, 42 and 43, and a bottom plate 45 mounted on spaced apart front and rear end plates 46 and 48, respectively. End plates 46 and 48 are octagonal shaped and are provided with threaded bores to receive mounting screws that secure plates 40-45 to the edge walls thereof as is best shown in FIG. 14. As assembled, plates 40-48 form a box-like housing.

Shifter assembly 33 is mounted on frame member 11 by a clamp which engages an arcuate extension 47 of bottom plate 45.

Figures 7, 8, 9:
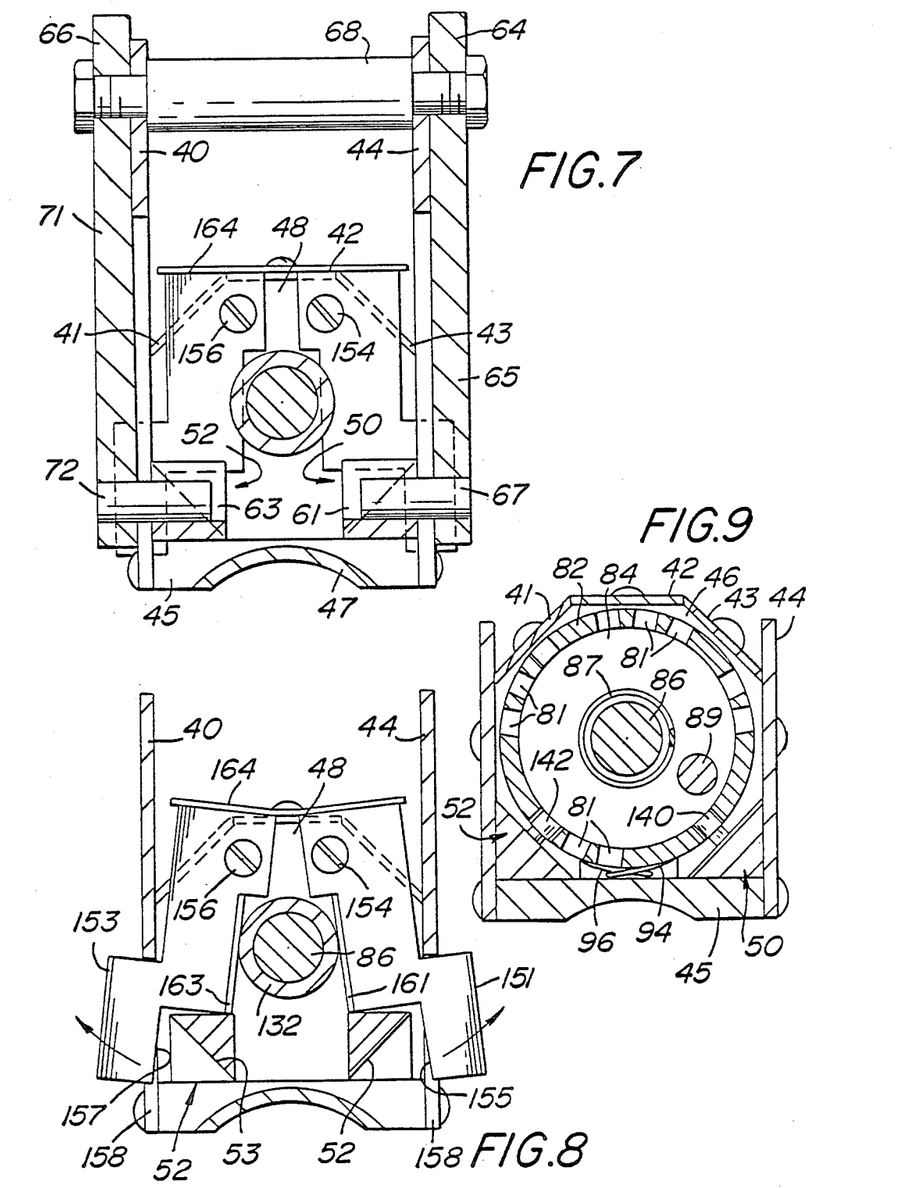
FIG. 7 is a sectional view taken generally on line 7—7 of FIG. 4.
FIG. 8 is a sectional view taken generally on line 8—8 of FIG. 4.
FIG. 9 is a sectional view taken generally on line 9—9 of FIG. 4.
Figures 10, 11, 12, 13:
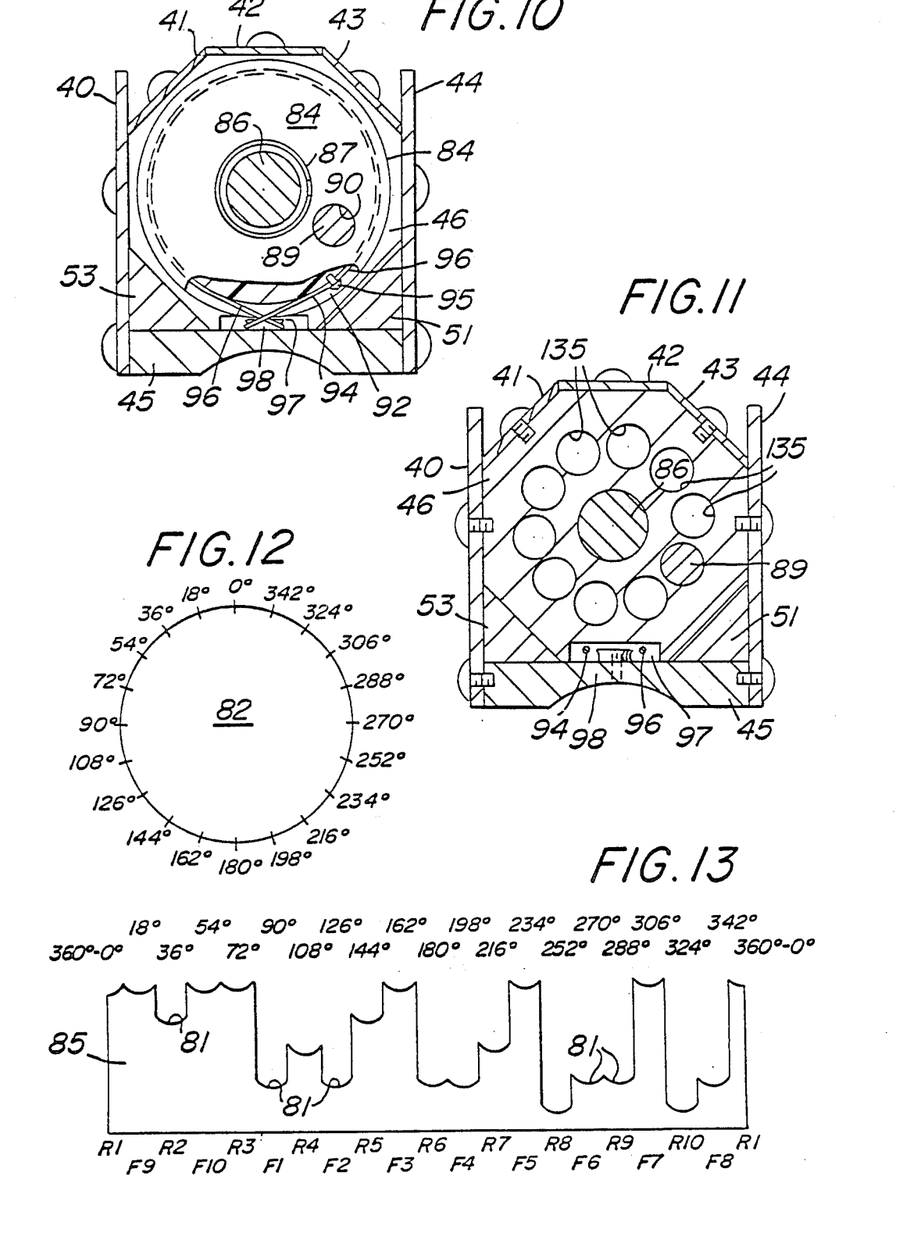
FIG. 10 is a sectional view taken generally on line 10—10 of FIG. 4.
FIG. 11 is a sectional view taken generally on line 11—11 of FIG. 4.
FIGS. 12 and 13 are diagrammatic and layout views of a detail of the selector assembly.

Shifter assembly 33 includes a rear control slide 50 associated with the rear derailleur cable means 32 and a front control slide 52 associated with the front derailleur cable means 30 as will be described hereafter. Control slides 50 and 52 are mounted in shifter assembly 33 for slidable movement along the length thereof. Rear control slide 50 is provided with a triangular portion 51 which fits with a sliding fit within the triangular opening formed at the front of the shifter housing within a lower edge 56 of front end plate 46 and opposed portions of the inner walls of side plate 44 and bottom plate 45 and within the triangular opening formed at the rear of the shifter housing within a lower edge 58 of rear end plate 48 and opposed portions of the inner walls of side plate 44 and bottom plate 45. By this arrangement, control slide 50 is guided for sliding movement along the length of the housing in a straight longitudinal path. In a like manner, the front control slide 52 is provided with a triangular portion 53 which is guided for longitudinal sliding movement by being confined in a sliding fit within the triangular opening formed between the lower edges 57 and 59 of front end plate 46 and rear end plate 48, respectively, and the opposing portions of the inner walls of side plate 40 and bottom plate 45. These triangular openings are best shown in FIGS. 8 and 11.

Figure 4:
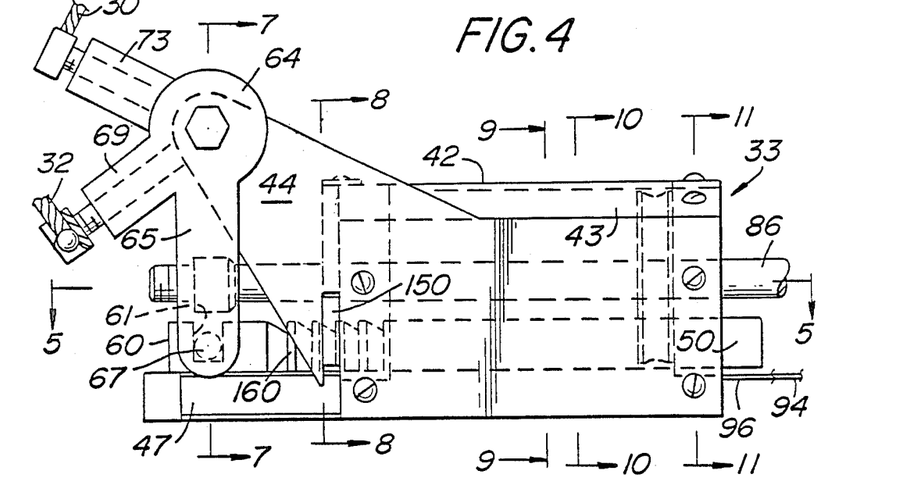
FIG. 4 is a side elevational view of a shifter assembly incorporated in the bicycle shown in FIG. 1.

Means are provided for connecting the control slides 50 and 52 to the cable means 32 and 30 in an arrangement whereby linear movement of the control slides 50 and 52 causes a corresponding movement of the cable means 32 and 30 which movement causes the positioning of the rear and front derailleurs, respectively, so as to position the drive chain of the bicycle for engagement with a corresponding sprocket. To this end, rear control slide 50 has a portion 60 extending on the exterior of the shifter housing, the portion 60 having a rectangular cross-section and being provided with a transverse slot 61. Likewise, front control slide 52 has an extended portion 62 provided with a transverse slot 63. A pair of bell-crank levers 64 and 66 are pivotally mounted on a pin 68 which is secured to extend between rearwardly extending portions of side plates 40 and 44 on an axis transverse to the longitudinal extent of the shifter housing. Lever 64 is mounted adjacent slide 50 and has a fixed length arm 65 which carries a pin 67 near its end received in slot 61 of control slide 50 as is best shown in FIG. 4. The other arm 69 of the lever 64 carries a connector 70 which is threadedly mounted therein for adjusting the length thereof and is adapted to have the end of cable means 32 secured thereto as is best shown in FIG. 14. In a like manner, lever 66 is mounted adjacent control slide 52 and has a fixed length arm 71 provided with a pin 72 received in slot 63 of control slide 52. The other arm 73 of lever 66 has a connector 74 threadedly mounted therein for adjusting the length thereof and is adapted to have the end of front control cable 30 secured thereto as best shown in FIG. 14.

The above-described arrangement is such that linear movement of the rear and front control slides 50 and 52 causes a corresponding actuating motion of the rear and front derailleurs by adjusting the position of the ends of control cable means 32 and 30 at connectors 70 and 74, respectively. The angle between the two arms of each lever 64 and 66 is chosen such that the direction of the control slide motion is translated into a different direction of motion at the adjustable arms 69 and 73 thereof. This new alignment of motion directs the associated cables 32 and 30 for a straight path toward each of the associated derailleurs without the need for additional routing hardware. The adjustable length lever arms 69 and 73 and connectors 70 and 74 providing the cable attachment thereto serve to adapt a single shifter design to a wide range of derailleur requirements.

In accordance with the invention there is provided means operatively engageable with control slides 50 and 52 for moving the same into positions corresponding to desired shifting positions of the front and rear derailleurs. Such means comprises a selector/actuator assembly 80 which is shown in FIGS. 5-11 and 14.

Figure 5:
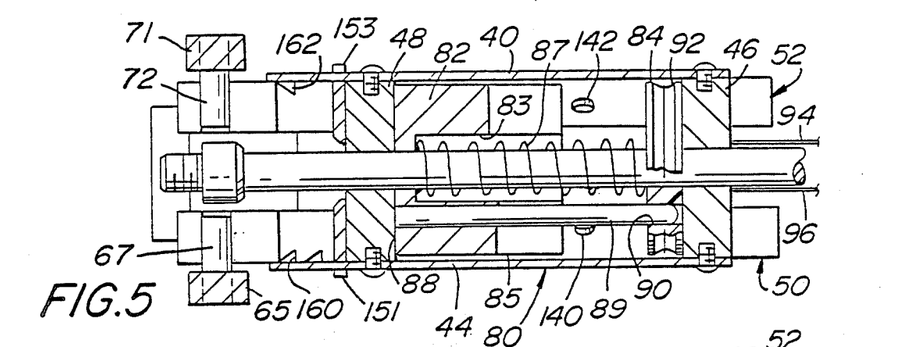
FIG. 5 is a sectional view taken on line 5—5 of FIG. 4.

The selector/actuator assembly 80 comprises a pair of selector/actuator members 82 and 84 mounted concentrically on a cylindrical rod 86 supported in cylindrical bores in end plates 46 and 48 at central locations as is best shown in FIGS. 5-11. Member 82 is generally cylindrical and has a central bore 83 adapted to receive a return spring 87 which extends in compression between the base 88 of member 82 and the opposing face of member 84. Return spring 87 is contained on rod 86 and applies a separating force to the selector/actuator members 82 and 84 to urge them apart to the position as shown in FIG. 5 with member 82 in contact with end plate 48 and member 84 in contact with end plate 46. Member 82 has a cylindrical side wall 85 and a circular base 88. Member 82 is permanently mounted on rod 86 for conjoint movement therewith either longitudinally or in rotation, as by a press fit. Member 84 is slidably mounted on rod 86 to permit the rod 86 to slide relative thereto as will be described hereafter. Member 84 has a pulley-like configuration as is apparent from a consideration of FIGS. 5 and 14 and has a grooved rim for a purpose to be described hereinafter.

Figure 6:
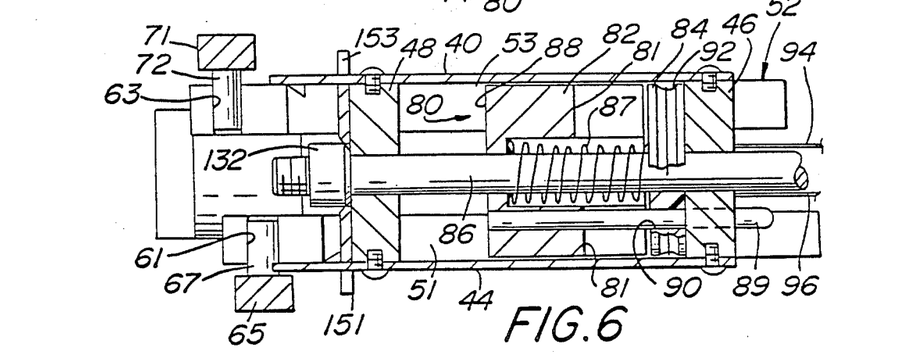
FIG. 6 is a view similar to FIG. 5 with the parts shown in an alternate operating position.

A guide rod 89 is carried on member 82 and extends from the base 88 thereof toward member 84 in spaced parallel relationship with rod 86. The extended end of the rod 89 is received in a hole 90 in member 84. As is shown in FIGS. 5 and 6, rod 89 is adapted to move slidably within hole 90 in member 84. By this arrangement, rod 89 serves to ensure joint rotation of members 82 and 84 and to maintain members 82 and 84 in fixed orientation during relative sliding movement of member 82 toward or away from member 84 as shown in FIGS. 5 and 6.

The return spring 87 serves as means for biasing members 82 and 84 to a non-actuated position in which members 82 and 84 are in contact with the end plates 46 and 48 as shown in FIG. 5. To this end, return spring 87 is a compression spring which extends between opposing surfaces of the base of member 82 and the inner face of member 84 as shown in FIGS. 5 and 6.

Selector/actuator member 84 has a circumferentially extending groove 92 formed in the rim thereof. This groove 92 receives a pair of cords 94 and 96 which are wrapped around the rim of member 84 and are secured thereto in a manner to cause rotation of selector/actuator member 84, which, by reason of the engagement of rod 89 between members 82 and 84, causes conjoint rotation of selector/actuator member 82. One end of each of the cords 94 and 96 is fastened to the rim of member 82 at groove 92 by a pin 95 as shown in FIG. 10. The cords 94 and 96 extend in groove 92 in opposite directions from pin 95 around the periphery of member 82 to wrap almost completely therearound and then cross over as shown in FIG. 10 and enter a recess in the bottom of end plate 46 where cords 94 and 96 pass around a small pulley 98 rotatably mounted in bottom plate 45 (see FIG. 11) to rotate on a vertical axis. From pulley 98 cords 94 and 96 pass in parallel from recess 97 in the bottom of end plate 46 to the exterior of shifter assembly 33 and extend in an upward forward direction along member 11 of bicycle frame 10 toward the handle bars 12 of the bicycle, as will be described more fully hereafter. The arrangement is such as that by proper movement of the cords 94 and 96 the member 82 can be rotated 360° to any position desired. As will be described hereafter, the cords 94 and 96 extend to the selector positioning assembly 34 which functions to position the member 82 into ten selecting positions.

Figure 3:
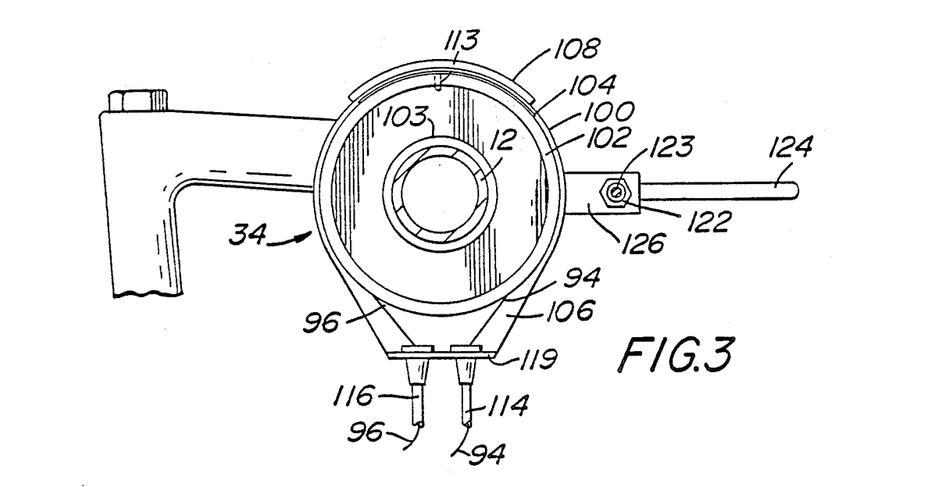
FIG. 3 is a view taken generally on line 3—3 of FIG. 2.

As best shown in FIGS. 2 and 3, the selector positioning assembly 34 comprises a pulley-like selector 100 having a grooved rim 102 and a cylindrical hub 103 mounted on handle bars 12 at a central location thereof. As shown in FIG. 2, hub 103 extends along handlebar 12 so that it can be grasped in the operator's hand for causing rotation of hub 103 and rim 102 together during a speed selecting movement. The assembly 34 comprises a speed indicator plate 104 on the periphery of rim 102 provided with numbered indicia "1-10" indicating the ten control positions for the ten speeds of the bicycle. The indicia "1-10" extend circumferentially about 100° around the surface of rim 102 and are arranged for clear visibility to the bicycle operator as shown in FIG. 2. A bracket 106 is fixedly mounted on handle bars 12 adjacent selector 100 and supports a transparent cover 108 which overlies the surface of rim 102 in the region of plate 104. Cover 108 is provided with a reference point 110 located adjacent the indicia "1-10" on plate 104 as shown in FIG. 2. The arrangement is such that when an "indicia 1-10" is aligned with the pointer 110 by the operator, the selector assembly 34 is positioned to the corresponding selecting positions.

Means are provided for guiding the upper portions of cords 94 and 96 onto the grooved rim 102 of selector 100. To this end, a pair of sheaths 114 and 116 extend between and have their ends mounted on a bracket 118 clamped on the frame member 11 and a flat portion 119 of bracket 106. Sheaths 114 and 116 contain cords 94 and 96, respectively, and guide the upper portions thereof onto the grooved portion of rim 102. Sheaths 114 and 116 also serve to maintain a constant cord distance between bracket 118 on frame member 11 and bracket portion 119 on handle bars 12 to accommodate movement of the handle bars 12. From the upper ends of the sheaths 114 and 116 the cords 94 and 96 extend around the periphery of rim 102 of selector to a point between indicia "5" and "6" whereat they are pinned to rim 102 by a pin 113. The parts are constructed and arranged so that hub 103 and rim 102 are rotatable about handlebar 12 and so that rotation of rim 102 of selector 100 in a clockwise direction as viewed in FIG. 3 causes cord 96 to move upwardly while cord 94 moves downwardly therefrom along frame member 11 toward the shifter assembly 33. This will cause rotation of member 84 in one direction, i.e., counterclockwise as viewed in FIG. 10. In a like manner, counterclockwise movement of rim 102 as viewed in FIG. 3 will cause a corresponding movement of the cords 94 and 96 to cause rotation of member 84 in the other direction, i.e., clockwise as viewed in FIG. 10. As described above, the rotational movement of member 84 will cause a conjoint movement of member 82 and all the parts of selector/actuator assembly 80.

The parts are constructed so that the movement of selector 100 between the ten control positions indicated on plate 108 in FIG. 2, will cause a corresponding rotation of the parts of selector/actuator assembly 80 to the ten selecting positions thereof.

Selector/actuator assembly 80 defines twenty reference points which are equivalent to the twenty reference points defined by the various selectors described in my prior U.S. Pat. No. 4,412,828, which disclosure is herein incorporated by reference. Accordingly, there are provided two reference points (one associated with each of the front and rear derailleurs) for each of the ten speeds of the bicycle.

The reference points on selector/actuator assembly 80 are defined by the center of curvature of the twenty arcuate edges 81 formed by the cylindrical side wall 85 of selector/actuator member 82. It will be noted that, as shown in FIG. 12, the center of curvatures of arcuate edges 81 are circumferentially equally spaced (18° apart) around the circumference of the side wall 85 of member 82.

The location and relative position of the reference points along the axial extent of the side wall 85 of member 82 is shown in FIG. 13 which is a layout view of the cylindrical side wall 85 of member 82. In FIG. 13 the ten reference points associated with the front derailleur are indicated at F1–F10 and the ten reference points associated with the rear derailleur are indicated at R1–R10 which corresponds to the showing in FIG. 20 of said patent. As is apparent from FIG. 13, the design is such that the front derailleur reference points F1–F10 and the rear derailleur reference points R1–R10 are alternated with $R_N$ being displaced ninety degrees from $F_N$. The reference points are alternated in order to accommodate a full rotation of selector/actuator assembly 80 for selection purposes. The reference points are displaced 90° in order to conform with the position of the control slides 50 and 52 which are also displaced 90°.

The selector positioning assembly 34, by movement of the selector 100 between the ten control positions thereof, operates to position the selector/actuator assembly 80 rotationally in ten selecting positions corresponding to the ten speeds of the bicycle. In each of these selecting positions, the side wall arcuate edges 81 forming one of the front derailleur reference points F1–F10 is aligned with the front control slide 52 and the side wall arcuate edges 81 forming the corresponding rear reference point R1–R10 is aligned with the rear control slide 50. For example, if speed number "1" is selected by the selector positioning assembly 34, the side wall arcuate edge 81 defining reference point F1 is aligned with the front control slide 52 and the side wall arcuate edge 81 defining reference point R1 is aligned with the rear control side 50, etc.

Means are provided for actuating control slides 50 and 52 into detented positions corresponding to the reference points selected by operation of the selector/actuator assembly 80. Such means causes a shifting movement of control slides 50 and 52 to positions thereof to cause a corresponding movement of the front and rear derailleur cable means 30 and 32 to place the front and rear derailleurs 20 and 22 in a desired shifting position. To this end, an actuator cable means, comprised of a sheath 122 and a wire 123, is operatively connected to the actuator lever assembly 35 which is comprised of a handle 124 pivoted at pivot 125. One end of wire 123 of the cable means is connected to handle 124 at connector 127 as shown in FIG. 2. The wire 123 extends from the handle connection through sheath 122 which has its one end mounted on a bracket 126 at lever assembly 35 and its other end mounted on bracket 118 on frame member 11. Wire 123 extends from bracket 118 down frame 11 to a connector 130 mounted on the forward end of the shifter rod 86 by means of a pair of nuts. The connector 130 has a U-shaped construction with one leg being secured to the end of the rod 86 and the other leg being connected to the lower end of the actuator cable means wire 123. In use, a pivoting movement of the handle 124 about pivot 125 in a counterclockwise direction away from the position shown in FIG. 2 causes the upper end of wire 123 to move upwardly whereby the lower end of wire 123 moves in a direction away from the forward end of the shifter assembly 33, which movement causes the actuator rod 86 to be moved from the position shown in FIG. 5 to the position shown in FIG. 6. The movement of the rod 86 is stopped by contact of a stop 132 on its end with the outer face of the end plate 48 as is shown in FIG. 6.

It will be apparent that when the shifter actuator rod 86 moves from a position shown in FIG. 5 to the position shown in FIG. 6 (an actuating movement), the parts of the shifter assembly 33 move from a selecting position to an actuating position and member 82 moves from a position spaced apart from member 84 to a position close to member 84.

Means are provided for aligning the selector/actuator assembly 80 in the ten selecting/actuating positions thereof during the actuating movement thereof. To this end, end plate 46 is provided with ten circumferentially equally spaced alignment holes 135 (FIG. 11). Holes 135 are located to be aligned with the circular rotating path of the guide rod 89 and are adapted to slidably receive guide rod 89 therein. The sliding fit between the holes 135 and the guide rod 89 are such that the members 82 and 84 are precisely aligned in the selecting/actuating positions during an actuating movement. In order to ensure proper entry of the guide rod 89 into holes 135, the cooperating ends of the guide rod 89 and the holes 115 are beveled.

Each of the control slides 50 and 52 is provided with means operatively engaged by the selector/actuator assembly 80 for positioning the control slides 50 and 52 in the control positions thereof. To this end, control slide 50 has a small peg 140 extending inwardly from the triangular portion 51 thereof a distance so as to be positioned within and in alignment with the reference point defining arcuate edges 81 in side wall 85 of selector/actuator member 82, as is best shown in FIG. 9. In a like manner, control slide 54 is provided with a peg 142 extending inwardly thereof so as to extend within and in alignment with the reference point defining arcuate edges 81 in the side wall 85 of selector/actuator member 82.

Means are provided for holding the control slides 50 and 52 in an actuate position after the gear selection has been made. Such means comprises a pair of fingers 151 and 153 pivotally mounted at pivots 154 and 156, respectively, on the outside of end plate 48. Inner edge portions 155 and 175 of pivoted fingers 151 and 153, respectively, are arranged to cooperate with saw-toothed detents 160 and 162 formed in the opposing portions control slides 50 and 52, respectively. There are five detents 160 and two detents 162 in control slides 50 and 52, respectively. A leaf spring 164 is mounted on the top edge of end plate 48 to urge fingers 151 and 153 together toward a position in which edge portions 155 and 157 are in engagement with the saw-toothed detents 160 and 162, respectively. The stop member 132 is adjustable along the threaded portion of the actuator rod 86. Stop 132 is adjustable to provide a variable degree of overshoot required by different derailleur types for smoothest shifting. Slides 50 and 52 are pulled slightly past the detend point during shifting. The derailleur springs pull them back into detent when the actuator lever is relaxed. Stop member 132 has a conical portion adapted to engage corresponding beveled inner edge portions 161 and 163 on the fingers 151 and 153, respectively, to urge them apart to a position shown in FIG. 8 whereby the edge portions 155 and 157 of the fingers 151 and 153, respectively, move apart to be out of engagement with the saw-toothed detents 160 and 162 allowing control slides 50 and 52 to move freely to a position corresponding to the control position of selector/actuator member 82. Plates 40 and 44 have slots 158 and 159 receiving fingers 153 and 151, respectively, and constructed to guide the same during their movement. In FIG. 7, the fingers 151 and 153 are positioned in their detent engaging positions whereby they hold the control slides 50 and 52 in the position to which they have been actuated during a prior gear shifting operation. FIG. 8 shows the position of the fingers 151 and 153 after the control rod 86 has been actuated to the position shown in FIG. 6 and with the edge portions 155 and 157 thereof out of engagement with the detent 160 and 162 in the control slides 50 and 52 whereby the slides 50 and 52 are free to move to any position determined by the cooperation between the pegs 140 and 142 and the reference point defining arcuate edges 81 of member 82 and the action of the return spring means of derailleurs 20 and 22, which, as discussed above, are spring biased to maintain cable means 30 and 32 in tension to thereby urge the control slides 50 and 52 (through levers 64 and 66) toward the rear end of the shifter assembly 33 at all times.

OPERATION OF THE EMBODIMENTS SHOWN IN FIGS. 1–14

In the first stop of a gear shifting operation, the selector/actuator assembly 33 is positioned to one of the ten selecting positions thereof by operating the selector positioning assembly 34. In this first step, the operator simply rotates selector 100 to the desired selecting position corresponding to the speed at which he wishes to operate the bicycle as described in detail above. This position will be indicated by the number of indicia "1-10" on speed indicator plate 104 aligned with the reference pointer 110. For example, as shown in FIG. 2, the selector 100 has been positioned to the gear speed "6". The movement of the selector 100 causes a rotating movement of the selector/actuator member 82 and a conjoint movement of member 84 to one of the ten selecting positions by the motion transmission caused by cords 94 and 96. This will place the proper two arcuate edges 81 in the side wall 85 of member 82 in alignment with the pegs 140 and 142 on the control slides 50 and 52 for the selected speed.

The next step in a gear shifting operation is the actuating step in which the operator squeezes the pivoted handle 124 of the actuator lever assembly 35 to cause handle 124 to pivot in a counterclockwise direction about pivot 125 as viewed in FIG. 2. This actuating movement causes the upper end of the wire 123 to be pulled upwardly to move the selector/actuator assembly 80 from the selecting position shown in FIG. 5 to the actuated position shown in FIG. 6 by movement of the actuator rod 86 between the positions shown in these figures. This actuating movement causes selector/actuator member 82 to move to the actuating position and cause the control slides 50 and 52 to move to the desired control position corresponding to the selected speed. This movement of member 82 will also cause compression of the return spring 87 as shown in FIG. 6. Since the control slides 50 and 52 are connected to the rear and front derailleurs 22 and 20 of the bicycle by way of the levers 64 and 66 and control cables 32 and 30, respectively, such derailleurs 22 and 20 will be positioned to the gear (speed) that was selected. When the actuator handle 124 is released by the operator, the return spring 87 expands causing the actuator rod 86 and member 82 carried thereby to return from the position shown in FIG. 6 to that shown in FIG. 5. The control slides 50 and 52 will not move from the selected position to which they have been actuated by reason of the engagement of the fingers 151 and 153 in the sawtoothed detents 160 and 162 so that the derailleurs 20 and 22 are retained in their selected speed position. However, since the rod 89 has moved out of its position within one of the ten holes 135 in end plate 46, members 82 and 84 are free to rotate so a new speed can be selected if desired.

It will be noted that when the selector/actuator member 82 is moved to the actuated position, as shown in FIG. 6, rod 89 extends within an aligned hole 135 in end plate 46 thereby preventing any rotating movement of members 82 and 84 when a gear shift is in progress.

During or at the end of the actuating movement whereat the operating handle 124 moves wire 123 to move actuator rod 86 forward until stopped by engagement of the stop member 132 with end plate 48 (See FIG. 6), one of 90 possible movements of the control slides 50 and 52 will have occurred depending upon the prior position of the control slides 50 and 52 and the gear selected. The number of unique shifting actions is $(N^2-N)$ where N=the number of gears. Thus, 10 speed=90, 15 speed=210, etc. This large number of unique shifting actions is what makes it so difficult to learn to shift with the present-day shifting mechanisms.

Accordingly, either, neither, or both of the control slides 50 and 52 may be moved forward by the engagement by the pegs 140 and 142 with the arcuate edges 81. In the event that either or both of the control slides 50 and 52 were already forward of the position required by the selected gear, such control slide is released by the conical edge of stop member 132 pushing apart the fingers 151 and 153 and the control slides 50 and 52 will thereupon be pulled to the correct position by the action of the return springs of the front and rear derailleurs 20 and 22 on the cable means 30 and 32 and by way of the connection of these cable means 30 and 32 to the control slides 50 and 52 through the pivoted levers 64 and 66, respectively. As discussed above, the return spring 87 returns the shifter assembly 33 to the selecting position when the operator releases handle 124 of actuator lever assembly 35.

It is to be noted that either or both of the control slides 50, 52 must be shifted to the rear one or more notches if its last position left it forward of the new position required by the present orientation of the slotted cylinder member 82. As actuation only moves member 82 forward, the control slide 50 and 52 does not move until the detent fingers 151, 153 are opened up by the adjustable stop 132 on the end of the actuator rod (at the end of the forward motion of member 82). When the detent fingers 151, 153 are open, the derailleur spring pulls the control slides 50, 52 rearward until the pegs 140, 142 therein reach an arcuate edge 81 in the member 82. The new position is now selected. When the actuator is relaxed, the detent fingers 151, 153 are released and their spring 164 holds them against the detents 160, 162 causing the control slides 50, 52 to be held at the new position after they are pulled back very slightly to seat the detent fingers 151, 153 against the saw tooth flat of detents 160, 162.

The control slides 50, 52 (either or both) must be shifted forward one or more notches if the last position thereof left it rearward of the new position required by the present orientation of the member 82. As member 82 is being moved forward by actuation, the control slide peg 140, 142 slides deeper into its aligned slot 81 until it reaches the end thereof. All of the additional forward motion of the member 82 causes a like amount of forward motion of the associated control slide 50, 52.

The control slides 50, 52 can be moved forward even thought the detents have not been opened at this time. The detent fingers 151, 153 ride up the slope of the detent saw tooth notches 160, 162 smoothly spreading the fingers 151, 153 against the detent spring 164. The flats of the detent notches 160, 162 prevent the control slides 50, 52 from moving rearward unless the detent fingers 151, 152 are spread apart. The result is a one-way detent means. The control slides 50, 52 are held in position against the derailleur spring associated therewith, but can be moved forward at any time. In the case of a control slide 50, 52 being shifted one or more notches forward, the opening of the detent fingers 151, 152 at the end of the shift has no effect. The detent fingers 151, 153 are always opened at the end of a shift because one or both of the control slides 50, 52 may need to move to the rear to satisfy the selected gear requirements. Thus, with one selector/actuator member 82 with twenty slots, working with controllable one-way detents on the control slides 50, 52, the required 90 unique shifting actions can be produced.

In order to facilitate stepped partial shifting, the selector positioning assembly 34 has gears 1, 2, 4, 6 and 8 marked on the left side of the indicia plate 104, such gears being the five low range gears (each engages the small front sprocket 25 with a different rear sprocket). Also, gears 3, 5, 7, 9 and 10 are marked on the right side of the plate 104 and are the five high range gears (each engages the large front sprocket 26 with a different rear sprocket.

As is conventional, complete actuation of the shifting means while pedaling the bicycle will cause a shift into the selected gear.

Sequential or stepped partial shifts are also possible to allow several successive downshifts within either the high range or low range group without the need for intervening gear selections for each gear into which the bicycle is shifted. For example, let it be assumed that the bicycle is being operated in gear No. 8. The operator notes that he is approaching a long, steep upgrade. In order to avoid several successive select-shift-select sequences that would be required for an efficient hill climb, he can initally select gear No. 1. then, as the bicycle begins to slow, partial actuation shifts the bicycle to gear No. 6, additional actuation to gear No. 4, and still further actuation to gear No. 2 to thereby provide a very smoothy series of downshifts for the hill climb without having to bother with any additional selection during the hill climb. Should the bicycle have crested the hill in gear No. 2, the bicycle operator can now select a higher gear even though the bicycle was never shifted all the way into the last selected gear No. 1.

In FIGS. 1A, 15, 16 and 17 there is shown a second embodiment of the invention constructed to be installed on bicycles previously equipped with a conventional shifter mechansim. This "aftermarket" version of the invention operates essentially the same way as the embodiment shown in FIGS. 1-14 as will be apparent from the following description.

The aftermarket version includes a shifter 33' which is constructed the same as shifter 33 but is operated by a different selector and actuator means. Shifter 33' is mounted on frame member 11 in the same location as shifter 33 by the same mounting means and is connected through cable means to the front and rear derailleurs in the same manner as shifter 33 as described above. The essential difference between the embodiments of FIGS. 1 and 1A is that the function of the wire 123 actuated by the actuator lever assembly 35 and also the function of the cords 94 and 96 actuated by the selector positioning assembly 34 are provided by an adjustable length rod 201 as will be described in detail hereafter. Accordingly, the wire 123 and the cords 94 and 96 are not necessary and are eliminated from the embodiment of FIG. 1A as is shown in the Drawings. If desired, shifter 33' could be modified further to eliminate the selector/actuator member 84 of shifter 33 and its function could be taken on by the endplate 46. However, this additional modification is not necessary and only the elimination of wire 123 and cords 94 and 96 would be absolutely necessary to modify a shifter 33 to be used in the embodiment of FIG. 1A.

The aftermarket version of the invention comprises a selector/indicator means 200 for causing rotation of rod 201 to perform a gear selecting operation and axial movement of rod 201 to perform an actuating operation. At its lower end, rod 201 is fixedly secured to the upper end of bracket 130 for conjoint movement therewith both in rotation and in movement toward or away from shifter 33'. This fixed connection is achieved by the use of a pair of lock nuts 204 which are secured on the lower end of rod 201 and are positioned to frictionally engage the upper leg of bracket 130. As described above, the lower leg of bracket 130 is fixedly secured on the forward end of shifter rod 86.

Figure 15:
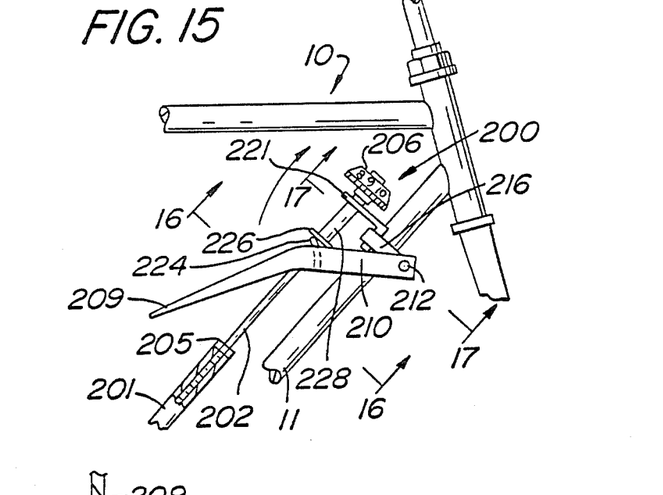
FIG. 15 is a view showing the selector/actuator means shown in FIG. 1A.

As is shown in FIG. 15, the upper end of rod 201 is provided with an extension 202 which is threadedly received in a threaded bore in rod 201 so as to be adjustable along the length of rod 201. A lock nut 25 is provided on extension 202 and is adapted to be frictionally engaged with the upper end of rod 201 for securing extension 202 in position after it has been adjusted to the desired length.

A selector knob 206 is fixedly secured on the upper end of extension 202 by an arrangement such that rotation of knob 206 by the operator will cause a corresponding rotational movement of extension 202 of rod 201 and also a corresponding rotation of the shifter rod 86 of the shifter assembly 33'. As described above with respect to the first embodiment, rotation of the shifter rod 86 causes a corresponding rotation of the selector member 82 which is fixedly mounted thereon. As is shown in FIG. 15, knob 206 has numbered indicia "1-10" marked on the periphery thereof so as to be visible to the operator who can rotate the knob 206 to any of ten positions corresponding to the ten speeds of the bicycle.

The selector knob 206 in conjunction with the rod 201 perform the function of the selector positioning assembly 34 of the FIG. 1 embodiment and, by movement of knob 206 to the ten control positions thereof this means operates to position the selector/actuator member 82 of the shifter assembly 33' rotationally into ten selecting positions corresponding to the ten speeds of the bicycle.

Figure 16:
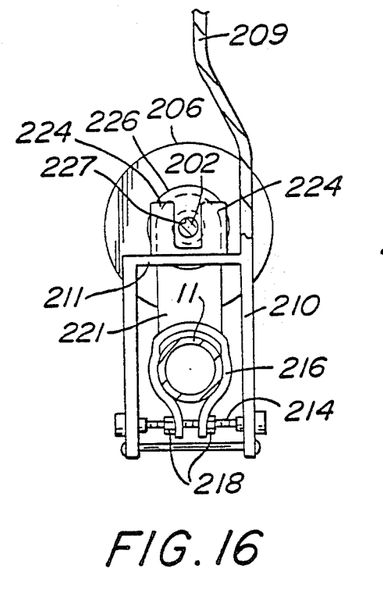
FIG. 16 is a sectional view taken generally on line 16—16 of FIG. 15.
Figure 17:
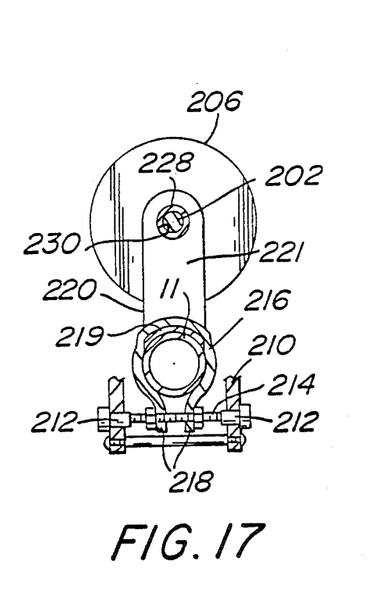
FIG. 17 is a sectional view taken generally on line 17—17 of FIG. 15.

The aftermarket version comprises an actuator lever assembly which causes rod 201 to be moved upwardly away from shifter assembly 33' causing a corresponding movement of the shifter rod 86 of shifter assembly 33'. This movement of the rod 86 causes a shifting movement of the control slides of the shifter assembly 33' through the selector/actuator assembly 80 to thereby cause a corresponding movement of the front and rear derailleur cable means to place the same in a desired shifting position. The actuator lever assembly is comprised of a handle 209 joined with a U-shaped lever arm 210 pivoted at a pair of pivots 212 on the end of a pin 214 carried by a clamp means 216 which is mounted on the frame member 11 in a manner best shown in FIGS. 16 and 17. The clamp means 216 includes a pair of tightening nuts 218 threadedly mounted on pin 214 to secure the parts with pin 214 extending below frame member 11 to provide bearing pivots 212 for the lever arm 210 as shown in these figures. Also, clamp means 216 mounts an L-shaped bracket 220 on frame member 11 by gripping the base 219 thereof. Backet 220 is provided with an upstanding leg 221 which provides support for the upper end of extension 202 of rod 201. The lever arm 210 has a pair of tabs 224 extending upwardly from the base 211 thereof. As shown in FIG. 16, tabs 224 are spaced apart and arranged to enclose the extension 202 of rod 201. Tabs 224 are arranged to contact the lower side of a disc 226 mounted at a central bore 227 on extension 202. Disc 226 is maintained in a spaced apart position from the knob by a cylindrical spacer 228. The spacer 228 is slidably received in a hole 230 in the upper end of the bracket leg 221.

The parts are constructed and arranged so that when the handle 209 and lever arm 210 are moved upwardly by the operator, i.e., pivoting in a clockwise direction about pivots 212, as viewed in FIG. 15, the tabs 224 move into contact with the disc 226 which causes the spacer 228 and knob 226 to be moved upwardly causing a corresponding movement of the upper end of extension 202 of rod 201. The raising of handle 209 causes the rod 201 to be moved upwardly along the frame member 11 causing an upward movement of bracket 130 and shifter rod 86 of the shifer assembly 33'. This movement causes the rod 86 to be moved from a position as shown in FIG. 5 to the position as shown in FIG. 6, the movement of the rod 86 being stopped by contact of the stop member 132 as described above with respect to the embodiment of FIGS. 1-14.

As described above with respect to FIGS. 1-14, when the shifter actuator rod 86 moves from the position shown in FIG. 5 to the position shown in FIG. 6 (an actuating movement), the parts of the shifter assembly 33' move from a selecting position to an actuating position and member 82 moves to a position for actuating the control slides to the desired gear selecting position as described in detail above. Moreover, as described above, the detent means serve to hold the control slides in the actuated position after a gear selection has been made.

Thus, the operation of the aftermarket version shown in FIGS. 1, 15, 16 and 17, is essentially the same as that of the embodiment of FIGS. 1-14. In the aftermarket version, the operator causes rotation of the selector knob 226 with his thumb to the selected gear speed and then operates the shifting handle 209 with the fingers of the same hand.

What is claimed is:

1. In a device such as a dual shift bicycle or the like having a plurality of drive gears and including a drive chain means, a front derailleur associated with a front drive gear means and movable to positions for shifting the drive chain means into selected drive positions, a rear derailleur associated with a rear drive gear means and movable to position for shifting the drive chain means into selected drive positions, a front derailleur shift means operatively connected at one end to the front derailleur and movable for positioning the front derailleur, and rear derailleur shift means operatively connected at one end to the rear derailleur and movable for positioning the rear derailleur, the improvement comprising:

means for shifting between the drive positions by moving the front and rear derailleur shift means to position the front and rear derailleurs, including:

control means including a front control member operatively engaged with said front derailleur shift means and movable through shifting movements between a plurality of control positions and rear control member operatively engaged with said rear derailleur shift means and movable through shifting movements between a plurality of control positions, selector/actuator means for selecting for each of said front and rear control members a selected control position to which said front and rear control members are to be moved in a gear shifting movement from a present control position to a selected control position and engageable with said front and rear control members for actuating the same through said shifting movement, said control position selection operation being independent of said actuation of said control members through said shifting movement so that the shifting between the drive gears can be performed in two sequential operations, and means for holding said front and rear control members in selected control positions thereof after said shifting movement.

2. A device according to claim 1, wherein said holding means is releasably engageable with said front and rear control members.

3. A device according to claim 1 wherein said holding means includes:

a first means for releasably engaging said front control member, and a second means for releasably engaging said rear control member.

4. A device according to claim 3, wherein said front control member comprises an elongated slide guided for sliding movement along the length thereof, said rear control member comprises an elongated slide guided for sliding movement along the length thereof, said front control member includes a plurality of detent notches, spaced along the length thereof at locations corresponding to the selected control positions thereof, and said rear control member includes a plurality of detent notches, spaced along the length thereof at locations corresponding to the selected control positions thereof.

5. A device according to claim 4, wherein said first means is releasably engageable with the detent notches of said front control member and said second means is releasably engageable with the detent notches of said rear control member.

6. A device according to claim 5, wherein said first means comprises a first finger movable between an engaged position in which said first finger is engaged with a detent notch of said front control member and a disengaged position in which said first finger is out of engagement with said detent notches of said front control member,
  and said second means includes a second finger movable between an engaged position in which said second finger is engaged within a detent notch of said rear control member and a disengaged position in which said second finger is out of engagement with said detent notches of said rear control member,
  said first means including means for biasing said first finger toward an engaged position, and said second means including means biasing said second finger toward said engaged position thereof.

7. A device according to claim 6, wherein said selector/actuator means includes means operatively engageable with said first and second fingers to move the same toward the disengaged positions thereof during said actuating movement.

8. A device according to claim 1, wherein said selector/actuator means includes a selector-actuator member which is provided with reference point defining means defining a plurality of reference points corresponding to the control positions of said front and rear control members.

9. A device according to claim 8, wherein said selector/actuator member has a generally cylindrical side wall, said reference point defining means comprising cutouts located circumferentially around said side wall at various axial positions.

10. A device according to claim 8, including a selector member and means for operatively coupling said selector/actuator member and said selector member for conjoint selecting movement.

11. A device according to claim 8, including motion transmitting means on said control members engageable by said selector/actuator member for moving said control members to positions corresponding to said reference points.

12. A device according to claim 8, including interlock means for preventing rotation of said selector/actuator member when in the actuated position thereof.

13. A device according to claim 1, wherein said selector/actuator means includes:
  a housing having a forward end plate and a rear end plate,
  an actuator rod mounted to pass through said end plates for axial sliding movement relative thereto,
  a selector/actuator member fixedly mounted on said actuator rod at a location between said end plates,
  and means for biasing said selector/actuator member to a non-actuated position.

14. A device according to claim 13, including means for aligning said member in the selecting position during the actuating movement thereof,
  said alignment means including a pin carried by said selector/actuator member and slidably receivable in one of a plurality of circumferentially spaced openings in said forward end plate during an actuating movement.

15. A device according to claim 1, wherein said selector/actuator means includes:
  a selector/actuator member which is provided with reference point defining means defining a plurality of reference points corresponding to the control positions of said front and rear control members,
  a selector member, and
  means for mounting said selector/actuator member and said selector member for conjoint movement and for movement between a spaced apart non-actuated position and an adjacent position,
  and including a selector cable assembly including a selector cable means engaged with said selector member for causing rotation thereof,
  and manually operable means engaged with said selector cable means and being constructed and arranged to cause a rotating selecting movement of said selector member to thereby cause a conjoint movement of said selector/actuator member.

16. A device according to claim 15, wherein said manually operable means includes a rotatable selector mounted on a handlebar of a bicycle at a location for easy access to the operator.

17. A device according to claim 16, wherein said manually operable means includes a pulley-like selector mounted for rotation about the bicycle handlebar and located so that it can be grasped by the operator's hand for causing rotation thereof during a speed selecting movement.

18. A device according to claim 16, wherein said pulley-like selector is provided with numbered indicia on the periphery thereof at a location to be visible to the operator and has said selector cable means extending around the periphery thereof and connected thereto.

19. A device according to claim 1, including a housing for said selector/actuator means having a forward end plate and a rear end plate,
  said selector/actuator means including an actuator rod mounted to pass through said end plates for axial sliding movement relative thereto,
  a selector/actuator member fixedly mounted on said actuator rod at a location between said end plates and closest to said rear end plate,
  and means for biasing said selector/actuator member to a non-actuated position,
  and including an actuator cable assembly comprising an actuator cable means engaged at one end with said actuator rod, and means for moving said actuator cable means during an actuating movement including a pivoted handle, the other end of said actuator cable means being connected to said handle whereby pivotal movement of said actuator handle causes movement of said actuator rod through an actuating movement, said actuator cable means being mounted on the handlebars of a bicycle for easy access to the operator.

20. A device according to claim 1 including a housing for said selector/actuator means having a forward end plate and a rear end plate,
  said selector/actuator means including:
  an actuator rod mounted to pass through said end plates for axial sliding movement relative thereto and extending forwardly from said forward end plate,
  a selector/actuator member being fixedly mounted on said actuator rod at a location between said end plates,
  manually operable means for causing rotation of said actuator rod to perform a gear selecting operation and axial movement of said actuator rod to perform an actuating movement,
  said manually operable means including an actuator rod extension fixedly connected at its lower end to the forward end of said actuator rod and extending therefrom along the frame of a bicycle to an upper end located in the region of the handle bars of said bicycle.

21. A device according to claim 20, wherein said manually operable means includes a selector knob fixedly secured on the upper end of said extension for causing rotation thereof and a corresponding rotation of said actuator rod, said knobs having numbered indicia marked on the periphery thereof so as to be visible to the operator.

22. A device according to claim 20, wherein said manually operable means includes an actuator lever assembly adapted to engage said extension rod for moving the same upwardly to cause a corresponding movement of the actuator rod for causing a shifting movement of said control members.

23. A device according to any one of the preceding claims, wherein, said front derailleur shift means includes a front cable operatively coupled to said front derailleur and to said front control means and being spring biased so as to be maintained in a tensioned condition, and said rear derailleur shift means includes a rear cable operatively coupled to said rear derailleur and to said rear control member and being spring biased so as to be maintained in a tensioned condition.

24. A device according to claim 23, wherein said front cable and said front control member are operatively coupled with a pivotally mounted front lever, said front lever including a pair of arms extending from the pivotal mounting thereof to spaced apart connecting locations, one of said connecting locations being on said front control member, the other of said connecting locations being on said front cable, and means for adjusting the connecting location of said front cable, and wherein said rear cable and said rear control member are operatively coupled with a pivotally mounted rear lever, said rear lever including a pair of arms extending from the pivotal mounting thereof to spaced apart connecting locations, one of said connecting locations being on said rear control member, the other of said connecting locations being on said rear cable, and means for adjusting the connecting location of said rear cable.

25. A device according to claim 24, wherein said front lever and said rear lever each have a bell crank configuration, said means for adjusting the connecting location of said front cable including a connector threadedly mounted on the respective lever arm of said front lever for adjustment relative thereto, and said means for adjusting the connecting location of said rear cable includes a connector threadedly mounted on the respective lever arm of said rear lever for adjustment relative thereto.

* * * * *